United States Patent
Muthukkaruppan

(10) Patent No.: US 6,182,202 B1
(45) Date of Patent: *Jan. 30, 2001

(54) GENERATING COMPUTER INSTRUCTIONS HAVING OPERAND OFFSET LENGTH FIELDS FOR DEFINING THE LENGTH OF VARIABLE LENGTH OPERAND OFFSETS

(75) Inventor: Kannan Muthukkaruppan, Foster City, CA (US)

(73) Assignee: Oracle Corporation, Redwood Shores, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/962,134

(22) Filed: Oct. 31, 1997

(51) Int. Cl.$^7$ ....................................... G06F 9/34
(52) U.S. Cl. ..................... 711/212; 711/214; 711/220; 712/210
(58) Field of Search ................ 395/386; 711/212, 711/214, 220; 712/210

(56) References Cited

U.S. PATENT DOCUMENTS

| | | | |
|---|---|---|---|
| 3,735,355 | * 5/1973 | Balogh, Jr. et al. | 711/212 |
| 4,241,397 | * 12/1980 | Streeker et al. | 711/220 |
| 4,466,057 | * 8/1984 | Houseman et al. | 712/210 |
| 4,825,355 | * 4/1989 | Kurakazu et al. | 712/224 |
| 4,868,740 | * 9/1989 | Kajimasa et al. | 711/2 |
| 5,038,280 | * 8/1991 | Watanabe et al. | 712/237 |
| 5,117,488 | * 5/1992 | Noguchi et al. | 712/210 |
| 5,179,676 | * 1/1993 | Kashima | 711/212 |
| 5,293,592 | * 3/1994 | Fu et al. | 712/210 |

OTHER PUBLICATIONS

MC68020 32-bit Microprocessor User's Manual 1985, pp. B-70 and B-87.*
i486 Microprocessor Programmer's Reference Manual 1989 pp. 26-1 to 26-7.*
Brumm, Penn. "80486 Programming," Windcrest 1991 p 181–186.*
"Java Virtual Machine Instruction Set," pp. 337 and 338, The JAVA™ Virtual Machine Specification.

* cited by examiner

Primary Examiner—Kenneth S. Kim
(74) Attorney, Agent, or Firm—Hickman Palermo Troung & Becker LLP; Carl L. Brandt

(57) ABSTRACT

A method and apparatus for storing a variable length operand offset in a computer instruction is provided. An operand base is stored in a computer instruction. Also stored in the computer instruction is a variable length operand offset that is associated with the operand base. In addition, an operand offset length is stored within the computer instruction that defines the length of the variable length operand offset. Storing an operand offset length with each variable length operand offset in a computer instruction provides for the reduction of unused space.

68 Claims, 6 Drawing Sheets

GENERATING COMPUTER INSTRUCTIONS HAVING OPERAND OFFSET LENGTH FIELDS FOR DEFINING THE LENGTH OF VARIABLE LENGTH OPERAND OFFSETS

FIELD OF THE INVENTION

The present invention relates to computer instructions, and more specifically to the storing of operand addresses in a computer instruction.

BACKGROUND OF THE INVENTION

Computer languages generally include instructions that contain an op-code and one or more operand addresses. The op-code typically represents a mathematical or logical operation that is to be performed by the instruction (e.g., MOV (move), ADD, STORE and SUB (subtract)). The operands represent a quantity or function that the mathematical or logical operation is to be performed on. For example, a computer instruction of MOV A, B contains the op-code MOV operating on the operands located at memory addresses A and B.

Commonly, a computer language allows operand addresses to be specified using either a direct addressing mode or an indirect addressing mode. In a direct addressing mode, the address specified in the computer instruction is the actual machine address at which is stored the data to be used for the operand. Conversely, in an indirect addressing mode, the address specified in the computer instruction is an address at which is stored an address that specifies the memory location that contains the data that is to be used for the operand.

For example, assume that A represents address location 100 in memory and B represents address location 102 in memory. The instruction MOV A,B uses direct addressing and causes the value stored in address 102 to be moved to address 100. As a further example, assume memory location 102 has a value of 200 stored in it and the instruction MOV A,[B] is executed. The instruction MOV A,[B] uses indirect addressing for the second operand (noted in this example by the brackets [ ] surrounding B) and direct addressing for the first operand (noted in this example by the lack of brackets surrounding A). Thus, the execution of this instruction causes the value stored at memory location 200 to be moved to memory location 100.

In typical database systems, users store, update and retrieve information by submitting commands, or, more generally, statements, to a database application. To be correctly processed, the statements must comply with a database language that is supported by the particular database system. For example, a database application may be configured to support the processing of database queries according to the Oracle-based Programming Language using Structured Query Language (PL/SQL).

Blocks of PL/SQL code (e.g., procedures, functions and packages) can be stored in a compiled format within a database. These compiled PL/SQL blocks can provide several advantages to a database system, such as increased security, increased performance and a reduction in memory requirements. For example, increased security can be provided by granting access to a schema object, such as a table, only through a particular stored procedure. Performance can be increased in a client-server environment since storing procedures within the database can reduce network traffic. Performance may also be increased as the stored procedures are already in a compiled format, and, thus, recompilation is unnecessary.

In addition, memory requirements can be reduced as only a single copy of a stored procedure needs to be stored in a shared area of memory which can be accessed by multiple users. A stored procedure can remain in a shared area of memory throughout a series of invocations by multiple users/applications, thereby avoiding the need to repeatedly retrieve the procedure from disk for each invocation.

In a compiled format, the PL/SQL code blocks specify a series of instructions for a virtual machine. The code blocks can be interpreted by a PL/SQL engine in order to execute the instructions contained in the code blocks. These instructions may contain operand addresses that are comprised of an operand address base pointer, sometimes referred to herein as an "operand base," (e.g., contents of a particular register, a stack frame pointer, etc.), and one or more operand address offsets (sometimes referred to herein as "operand offsets" or "offsets".) For example, in the instruction ADD REG+A,5, the address stored in register REG is the operand address base pointer and A is an operand address offset. Thus, executing this instruction adds 5 to the value stored at the memory address X+A where X is the address stored in register REG. If register REG stores the address 100 and A has a value of 3, executing the instruction ADD REG+A,5 adds 5 to the value stored in memory location 103.

As a further example, consider the instruction MOVC FP+A, DL[4][8]. In this example, the first operand address in the instruction is comprised of an operand address base pointer represented by frame pointer register FP and an operand address offset represented by the variable A. As shown by the lack of brackets, the operand address offset A is specified in the direct addressing mode. Conversely, the second operand address in the instruction is comprised of an operand address base pointer represented by a register DL and two operand address offsets represented by [4] and [8]. As indicated by the brackets, the two operand address offsets [4] and [8] are each specified in the indirect addressing mode. The second operand address is computed as follows:

1) the value stored in register DL is added to 4 to produce a first address;
2) the value stored in memory at the first address is added to 8 to produce a second address;
3) the second operand address is the value stored in memory at the second address.

Typically, instruction formats allocate a fixed amount of space for each operand address offset. The fixed amount of space is determined by the largest possible value for an operand address offset.

For example, FIG. 1 illustrates an instruction 100 in which a typical fixed storage technique is used to allocate a fixed number of bytes (4) for each operand offset. As depicted in FIG. 1, instruction 100 is comprised of an op-code 102, operand bases 104 and 116, operand offsets 138, 140 and 142, and control codes 114, 126 and 136. Control codes 114, 126 and 136 are associated with operand offsets 138, 140 and 142 respectively, and are used to indicate whether a particular operand offset is applied in a direct or indirect addressing mode. In addition, the control codes 114, 126 and 136 are used to indicate whether another operand offset is associated with a particular operand base. Thus, as depicted in FIG. 1, using this fixed storage technique, instruction 100 can be represented using 18 bytes.

However, a drawback associated with allocating a fixed amount of space for each operand offset is that compiled PL/SQL blocks are larger than necessary since many operand offsets require less than the fixed amount of allocated space (this is evident in instruction 100 as operand offset bytes 106, 108, 110, 118, 120, 122, 128, 130 and 132 are all set to zero). Because the compiled PL/SQL blocks are larger than necessary, a fewer number of blocks can be simultaneously resident in the shared memory area allocated for stored PL/SQL blocks. This problem is exacerbated as the shared memory area becomes fragmented, i.e. one or more PL/SQL blocks might have to be removed from the shared area to make room for another PL/SQL block even though the total amount of free (though not contiguous) space available in the shared area is large enough to hold the newly required PL/SQL block. This results in a greater number of retrievals of compiled PL/SQL blocks from disk, and a resultant degradation in database performance.

Another detrimental side effect associated with allocating a fixed amount of space for each operand offset is a reduction in the scalability of the system. Scalability is a measure of the number of concurrent applications that can be resident in memory and executing with satisfactory performance on a system at one time. As the compiled PL/SQL blocks are larger, less of them can be resident in memory at the same time. This results in a reduction in the number of applications that can execute concurrently, since the compiled PL/SQL blocks that are required for the applications wanting to execute may not be able to reside in memory simultaneously.

Another drawback associated with allocating a fixed amount of space for each operand offset is that additional, unnecessary processing is performed on unused memory bytes of an operand offset. Stored operand offsets are typically processed by a PL/SQL engine on a byte by byte basis, in order to generate a corresponding integer value of the operand offset in a "native" (i.e., machine dependent) format that is expected by the machine on which the PL/SQL engine is executing. For example, integers in an PL/SQL virtual machine ("VM") instruction might be stored with the most significant byte first, whereas in a corresponding native instruction integers might be stored in the opposite manner (i.e., with the least significant byte first). In this case, the PL/SQL engine would multiply each byte (of an integer) by an appropriate power of two, and sum the results to produce the same integer for the native instruction format. This can require unnecessary processing if the PL/SQL engine must assume that each operand offset requires a fixed number of bytes (e.g., 4). If an operand offset only requires one non-zero byte, the PL/SQL engine performs three unnecessary multiplications.

Even if the native and PL/SQL VM integer formats are the same, the PL/SQL engine may have to copy the VM formatted operand offsets that are stored at locations that are not byte aligned (as required by the native instruction format) to a new location that is properly byte aligned. Unnecessary copying of unused operand offset bytes is performed if the PL/SQL engine must assume that each operand offset is of a fixed size.

One approach to reducing the wasted space problem is to provide multiple instructions for each op-code (e.g., MOV1, MOV2, MOV3 for the op-code MOV) which accommodate different fixed size operands. By using the instruction (op-code) that uses the smallest fixed size operand offsets large enough to hold the required offset values, the amount of wasted space in an instruction can be reduced. For example, a MOV1 instruction can comprise the op-code MOV1 and two operand offsets that are each one byte in size, and a MOV2 instruction can comprise the op-code MOV2 and two operand offsets that are each two bytes in size.

By using the MOV1 instruction whenever the operand offsets require only one byte each and the MOV2 instruction whenever the operand offsets require two bytes each, the wasted space problem can be reduced. However, a drawback with this approach is that it significantly increases the number of instructions that must be supported by a particular system. For example, if a MOV instruction can have two operand offsets, each comprising up to four bytes in size, the system that is executing the instructions must support $4^2$ or sixteen different MOV instructions if it is to support all possible combinations of operand offset sizes. Therefore, this approach may be viable for a RISC like language like JAVA. However, for a database language such as PL/SQL, the number of instructions would quickly become overwhelmingly large as database instructions tend to be longer and more complex and therefore would require many more instruction permutations.

Based on the foregoing, it is desirable to provide a mechanism for reducing the amount of unused space in fields of an instruction that store operand address offsets without having to increase the number of instructions that must be supported by a particular system.

SUMMARY OF THE INVENTION

A method and apparatus for storing a variable length operand offset in a computer instruction is provided. According to one aspect of the invention, an operand base is stored in a computer instruction. Also stored in the computer instruction is a variable length operand offset that is associated with the operand base. In addition, an operand offset length is stored within the computer instruction that defines the length of the variable length operand offset.

According to another aspect of the invention, a control code is stored in the computer instruction and is used to indicate whether an associated variable length operand offset is to be applied with a direct or indirect addressing node.

According to another aspect of the invention, the operand base and operand offset length are stored in a single byte within the computer instruction.

According to another aspect of the invention, the operand offset length and the control code are stored in a single byte within the computer instruction.

According to another aspect of the invention, the operand base, the operand offset length and the control code are stored in a single byte within the computer instruction.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for storing variable length operand offsets in a computer instruction is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 2:
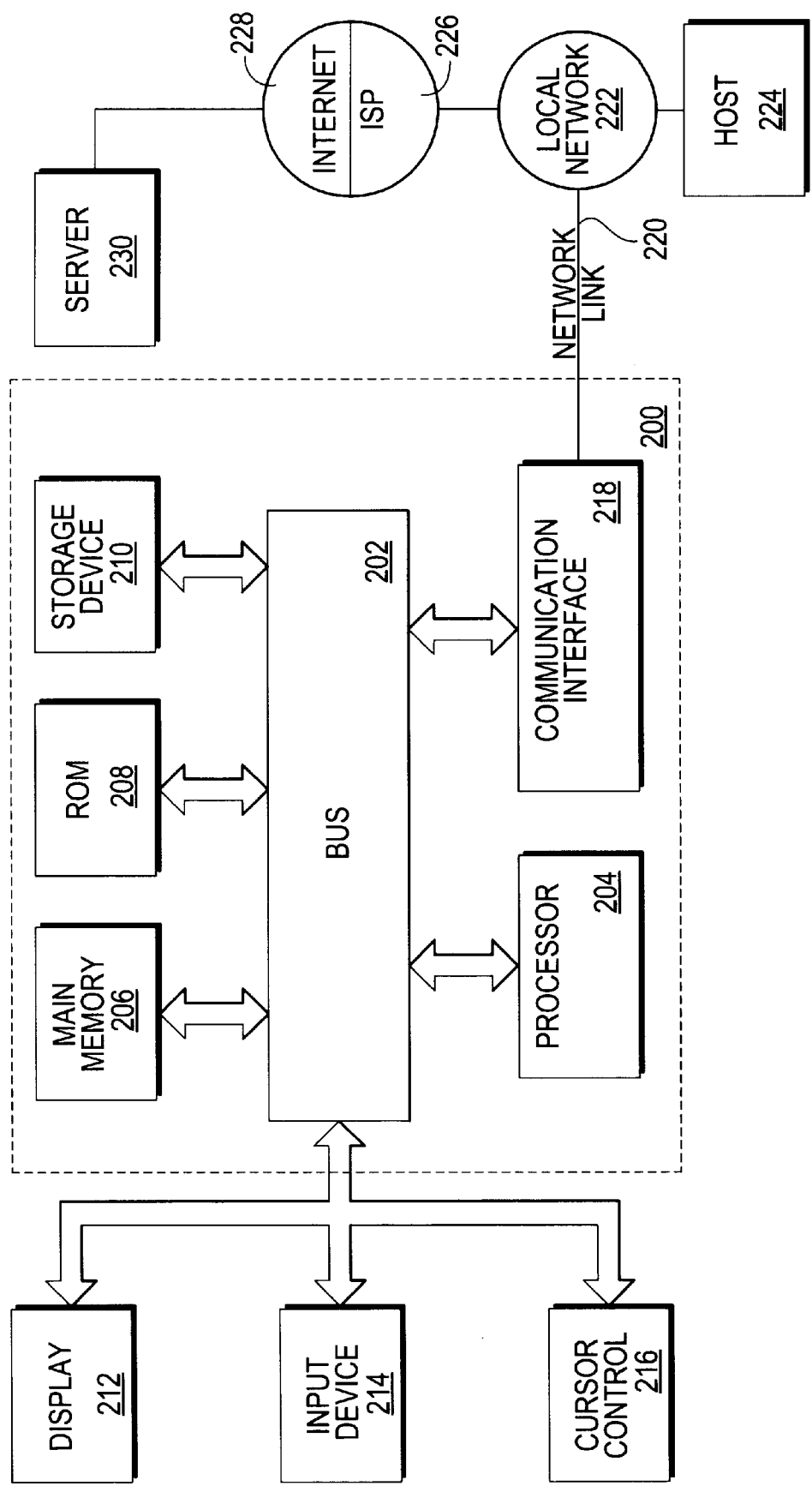
FIG. 2 is a block diagram of a computer system upon which an embodiment of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for storing variable length operand offsets in a computer instruction. According to one embodiment of the invention, the storing of variable length operand offsets in a computer instruction is provided by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch-cards, paper-tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector coupled to bus 202 can receive the data carried in the infra-red signal and place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application provides for the storing of variable length operand offsets in a computer instruction as described herein.

The received code may be executed by processor 204 as it is received, and/or stored in storage device 210, or other non-volatile storage for later execution. In this manner, computer system 200 may obtain application code in the form of a carrier wave.

STORING AN OPERAND OFFSET LENGTH

One approach to reducing the amount of unused space in an instruction without increasing the actual number of instructions (op-codes), is to store the length of each operand offset within the instruction. By storing an associated operand offset length with each operand offset, the amount of wasted space is reduced as unused operand offset bytes no longer need to be stored within the instruction. Reducing the amount of unused space has the advantage of decreasing the size of the compiled PL/SQL blocks. Decreasing the size of the compiled PL/SQL blocks increases the number of compiled PL/SQL blocks that can be simultaneously resident in shared memory. By increasing the number of compiled PL/SQL blocks that are simultaneously resident in shared memory, the scalability of the system is increased as more resources are available to support a greater number of applications executing concurrently.

An additional benefit associated with reducing the amount of wasted space is that for certain systems, decreasing the size of the compiled PL/SQL blocks can reduce fragmentation problems. The fragmentation problem may be reduced as the smaller PL/SQL blocks may be able to fit within an available contiguous memory space that could not accommodate corresponding larger compiled PL/SQL blocks that use fixed size operand offsets.

Another benefit associated with storing the length of each operand offset in the associated instruction is that additional, unnecessary processing of unused operand offset bytes is significantly reduced. By storing the length of each operand offset, unused operand offset bytes can be eliminated, and, thus the PL/SQL engine is not required to access and process unused operand offsets bytes.

Figure 3:
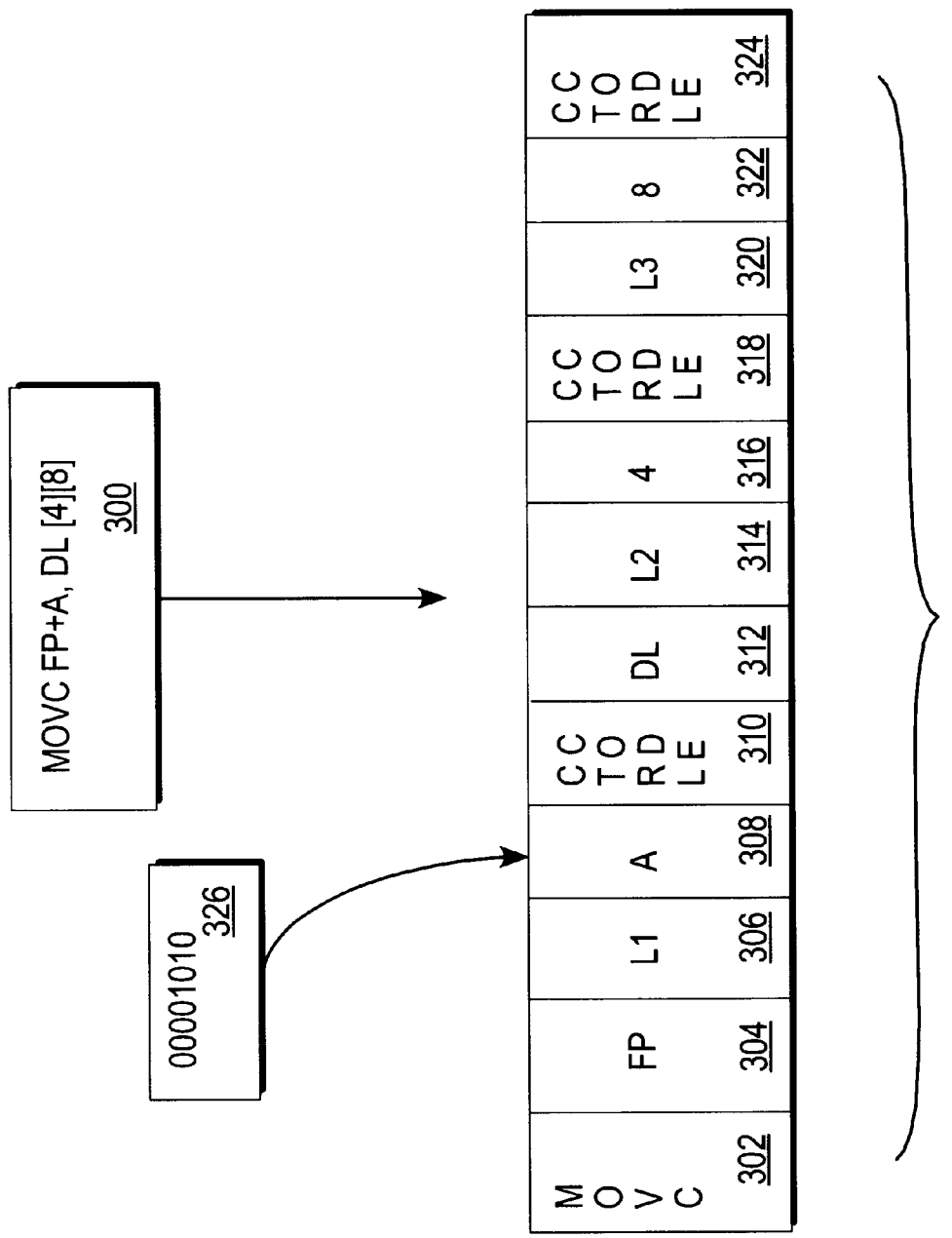
FIG. 3 is a block diagram depicting the storing of operand offset lengths in computer instructions according to an embodiment of the invention.

FIG. 3 depicts the storing of operand offset lengths in an instruction according to one embodiment of the invention. As depicted, the instruction MOVC FP+A, DL[4][8], which was described above, is stored as instruction 300. Instruction 300 is comprised of an op-code byte 302, operand base bytes 304 and 312, operand offset bytes 308, 316 and 322, control code bytes 310, 318 and 324, and operand offset length bytes 306, 314 and 320.

Control code bytes 310, 318 and 324 are associated with operand offset bytes 308, 316 and 322 respectively and are used to indicate whether a particular operand offset is applied in a direct or indirect addressing mode. In addition, the control code bytes 310, 318 and 324 are used to indicate whether the associated operand offset is the last operand offset associated with a particular operand base, since a variable number of operand offsets may be associated with each operand base. Because there are only four possible control code states (e.g. direct/more offsets, direct/no more offsets, indirect/more offsets and indirect/no more offsets) in certain embodiments, the control code values are represented using only two of the eight bits contained in control code bytes 310, 318 and 324.

Operand offset length bytes 306, 314 and 320 are associated with operand offset bytes 308, 316 and 322 respectively. The value of each operand offset length byte indicates the number of bytes that are required to store the value of its associated operand offset. For example, for instruction 300, the operand offset length L1 in byte operand offset length 306 has a value of one since its associated operand offset in operand offset byte 308 can be represented by a single byte. This is true because, in this example, operand offset A in operand offset byte 308 has an integer value of 10, which as shown by bits 326, can be represented in one byte (i.e., 8 bits). If, on the other hand, the operand offset in operand offset byte 308 was equal to the integer value 1024, the operand offset length L1 in operand offset length byte 306 would have a value of two, since the integer value 1024 requires two bytes to be represented (i.e., 000000100 00000000$_2$=1024$_{10}$).

The operand offset length associated with an operand offset must be interpreted before the operand offset can be operated on. Therefore, in certain embodiments, each operand offset length is stored to the left of its associated operand offset to cause the operand offset length to be interpreted first.

Using operand offset lengths, operand offsets can be of variable length. Because operand offsets can be of variable length, operand offsets can be stored in instruction 300 without any unused bytes. Using a separate byte to store each operand offset length results in shorter instructions than instructions using fixed 4-byte operand offsets when the average operand offset value requires less than three bytes. For example, by eliminating the need to store unused operand offset bytes (e.g.,bytes 106, 108, 110, 118, 120, 122, 128, 130 and 132 of FIG. 1), instruction 300 can be represented using 12 bytes. This is in contrast to the 18 bytes that were previously needed for instruction 100 of FIG. 1.

INTEGRATING OPERAND OFFSET LENGTHS WITH CONTROL CODES

As previously indicated above, in certain configurations, the control codes can be represented using only two bits. In addition, when operand offsets are limited to values that can be represented by four bytes, the value of the operand offset lengths can be represent using two bits. For example, a one byte operand offset can be represented by the two bit configuration "00", a two byte operand offset can be represented by the two bit configuration "01", a three byte operand offset can be represented by the two bit configuration "10", and a four byte operand offset can be represented by the two bit configuration "11". Therefore, because the length of an operand can be indicated using only two bits and the control codes require only two bits, an operand offset length/control code pair of four bits can be stored in a single byte (i.e. 8 bits). By storing operand offset length/control code pairs in a single byte, the size of a particular instruction can be further reduced.

Figure 4:
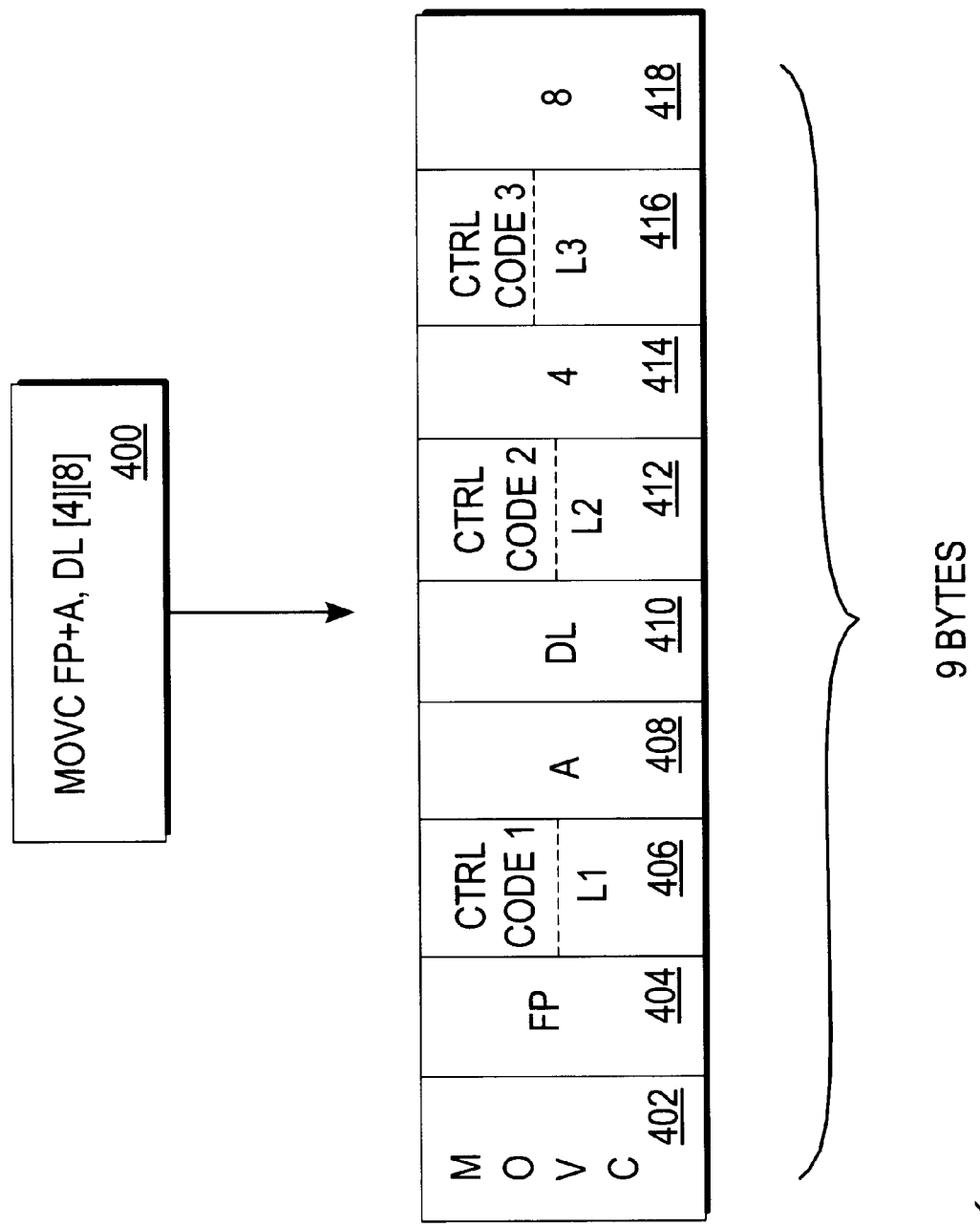
FIG. 4 is a block diagram depicting the storing of an operand offset length and control code within a single byte in computer instructions according to an embodiment of the invention.

FIG. 4 depicts the storing of operand offset length/control code pairs in a single byte according to one embodiment of the invention. As depicted, instruction 400 is comprised of an op-code 402, operand bases 404 and 410, operand offsets 408, 414 and 418, and operand offset length/control code pairs 406, 412 and 416. The operand offset length/control code pairs 406, 412 and 416 are respectively associated with operand offsets 408, 414 and 418. Although operand offset lengths and control codes are combined within a single byte, they perform the same functions as previously described above. To take advantage of storing an associated operand offset length with each operand offset, the operand offset length/control code pairs are stored to the left of each associated operand offset in order to cause each operand offset length to be interpreted before its associated operand offset is processed.

By combining operand offset lengths and control codes that are associated with the same operand offset, the unused bits in both the operand offset lengths and the control codes can be reduced. Storing operand offset lengths and control codes together in a single byte results in shorter instructions than instructions using fixed 4-byte operand offsets when the average operand offset value requires less than four bytes. For example, by eliminating the need to store unused operand offset length and control code bits, instruction 400 can be represented using 9 bytes, as opposed to 12 bytes for corresponding instruction 300 (FIG. 3). This further reduction in instruction size provides for a further decrease in the size of compiled PL/SQL blocks. This in turn helps to further increase scalability and decrease fragmentation problems within a computer system.

INTEGRATING AN OPERAND OFFSET LENGTHS/CONTROL CODES PAIR WITH AN OPERAND BASE

In certain cases, the operand bases can be represented in fewer than eight bits. For example, if a system provides for 16 distinct registers that can be used as an operand base, an operand base can be represented using four bits. Therefore, by using 16 distinct operand bases, an operand base (represented by four bits) and a operand offset length/control code pair (also represented by a total of four bits) can be stored in a single byte of 8 bits. By storing an operand base and an operand offset length/control code pair in a single byte, the size of a particular instruction is further reduced.

FIG. 500 depicts the storing of an operand base and an operand offset length/control code pair in a single byte according to one embodiment of the invention. As depicted, instruction 500 is comprised of an op-code 502, operand offsets 506, 510 and 514, an operand offset length/control code pair 512 and two operand base/operand offset length/control code triplet bytes 504 and 508. The offset length/control code pair contained in operand base/operand offset length/control code triplet byte 504 is associated with operand offset 506 and the offset length/control code pair contained in operand base/operand offset length/control code triplet byte 508 is associated with operand offset 510. The offset length/control code pair 512 is associated with operand offset byte 514.

By combining operand bases with operand offset length/control code pairs in a single byte, the unused bits formerly in the operand base bytes and operand offset length/control code bytes are eliminated. By eliminating unused bits for the operand bases and the operand offset length/control code pairs, instruction 500 can be represented using 7 bytes. This further reduction in instruction size provides for a further decrease in the size of compiled PL/SQL blocks leads to a further increase in scalability and a further decrease in fragmentation problems in a computer system.

OTHER STORING MECHANISMS

Figure 6:
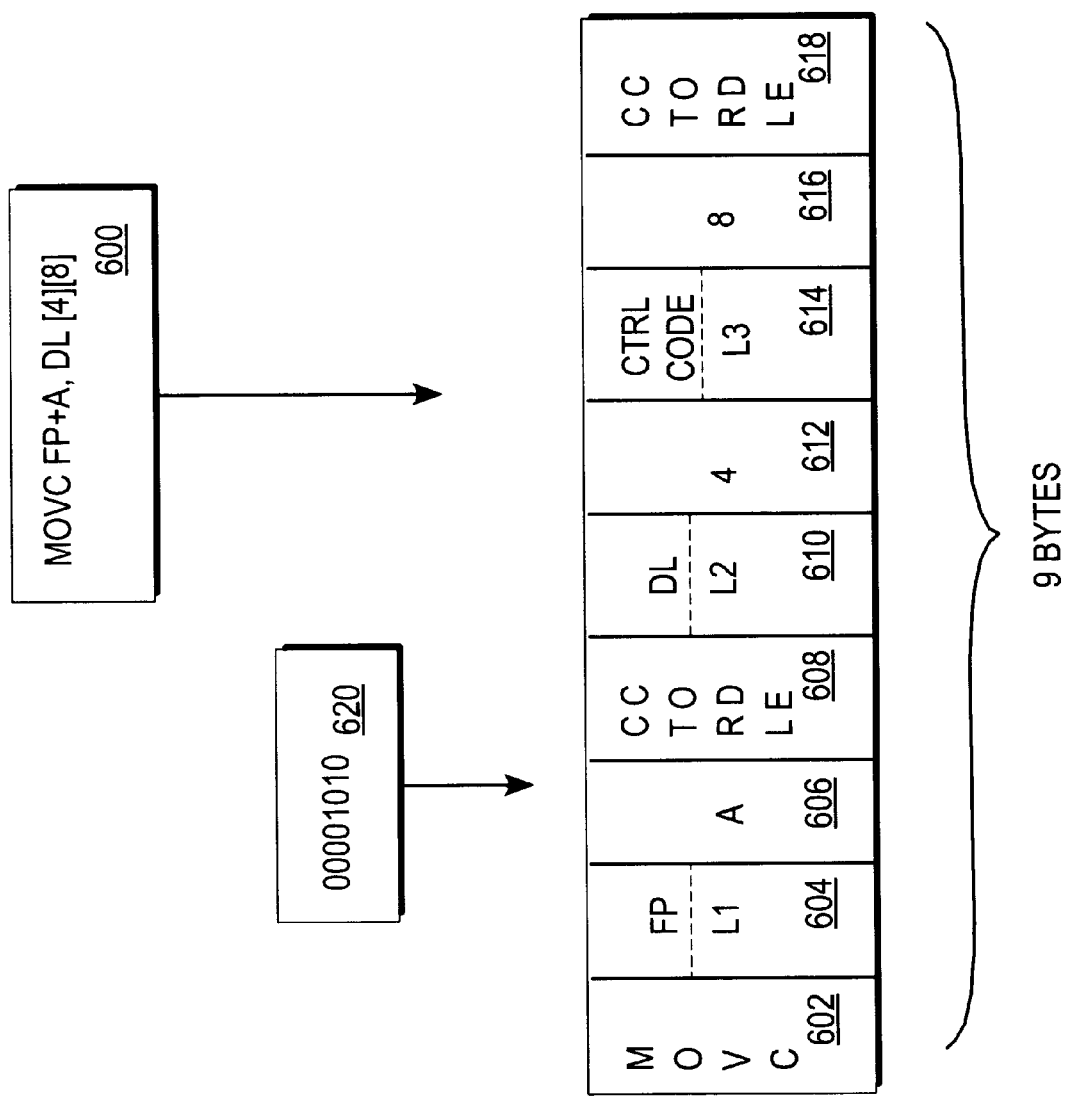
FIG. 6 is a block diagram depicting the storing of an operand offset length and operand base within a single byte and an operand offset length and control code within a single byte in computer instructions according to an embodiment of the invention.

Although the previous examples describe several embodiments for storing operand offset lengths to reduce the amount of unused space, still other similar storing embodiments exist. For example, FIG. 6 illustrates the storing of operand base/operand offset length pairs in addition to the storing of operand offset length/control pairs to reduce the amount of unused space according to one embodiment. As depicted, instruction 600 is comprised of an op-code 602, operand offsets 606, 612 and 616, operand offset length/control code pair 614, operand base/operand offset length 604 and 610 and control codes 608 and 618.

By combining the operand bases with operand offset lengths in bytes 604 and 610 and an operand offset length with a control code in byte 614, the unused bits in instruction 600 are reduced. Thus, by reducing the unused bits instruction 600 can be represented using 9 bytes.

IDENTIFYING THE SIGN OF AN OPERAND OFFSET

As previously indicated, in certain configurations, an operand offset length/control code pair can be represented together in a single byte using less than the 8 available bits (i.e. 1 or more unused bits). Therefore, in certain embodiments of the invention, an operand offset sign (i.e. a single bit) is stored within an unused bit of the single bytes that contain operand offset length/control code pairs. By storing an operand sign with an operand offset length/control code pair, the range of values that can be represented by the associated operand offset is doubled.

For example, conventionally a one byte operand offset represents values in the range of −127 to +127 (i.e. 1 bit of the 8 available bits is used for the operand offset sign). However, by storing an operand offset sign with each operand offset length/control code pair, all 8 bits are available and therefore a single byte operand offset can represent values in the range −255 to +255.

By extending a single byte operand offset to represent values in the range of −255 to +255, the size of the instruction can be reduced for certain operand offset values. For example, to store an operand offset value of +200 in an instruction in which single byte operand offsets can only represent values in the range of −127 to +127, a minimum of 2 bytes is required to store the operand offset value of +200. However, if a single byte operand offset can represent values in the range of −255 to +255, a single byte can be used to store the operand offset value of +200. Therefore, as illustrated in this example, by storing an operand offset sign with the operand offset length/control code pairs, the instruction size can be reduced for certain operand offset values.

UNUSED SPACE REDUCTION

Figure 1:
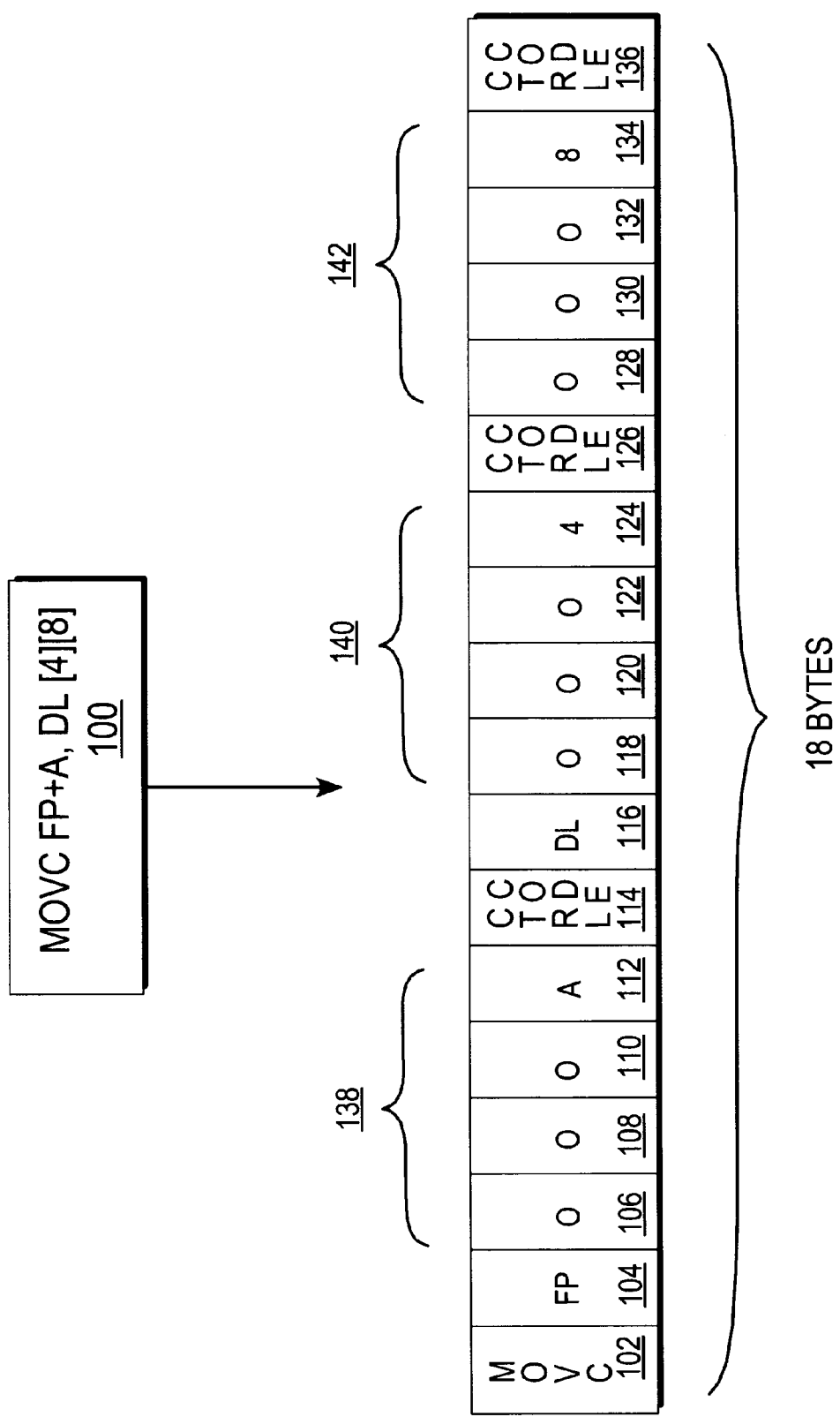
FIG. 1 is a block diagram depicting how instructions with fixed size operand offsets may conventionally be stored in computer instructions.
Figure 5:
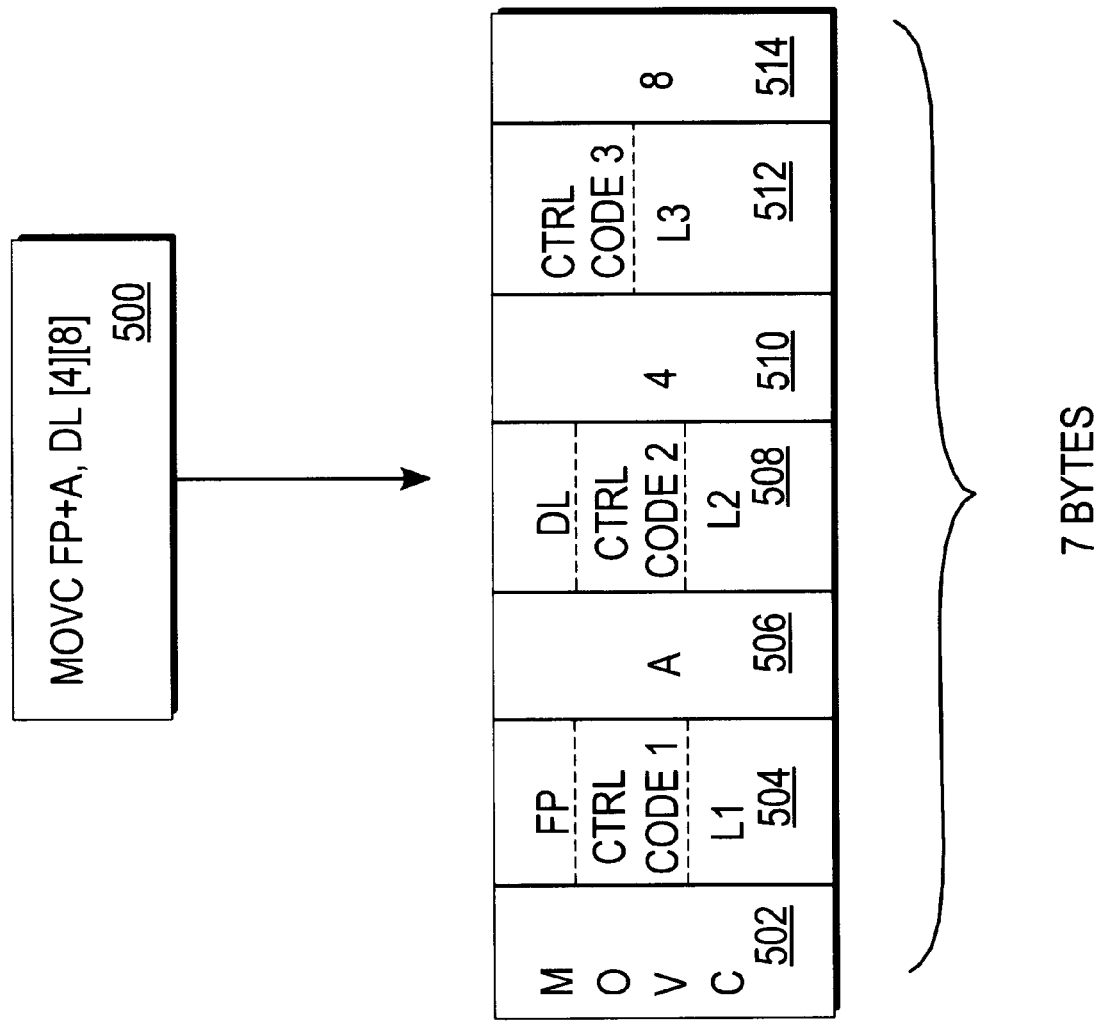
FIG. 5 is a block diagram depicting the storing an operand offset length, control code and operand base within a single byte in computer instructions according to an embodiment of the invention.

From FIG. 1, where 18 bytes were used to represent instruction 100, to FIG. 5, where 7 bytes were used to represent the same instruction, certain embodiments of the invention produced an 11 byte decrease in instruction size. Therefore, by storing an associated operand offset length with each operand offset, the amount of wasted space is decreased, thus reducing the size of the compiled PL/SQL blocks. This decrease allows a greater number of compiled PL/SQL blocks to be simultaneously resident in shared memory, thereby increasing the scalability of the system. This reduction in compiled PL/SQL block size can also reduce fragmentation problems on certain systems. Additionally, storing the length of each operand offset in the associated instruction reduces unnecessary processing of unused operand offset bytes as the PL/SQL engine is not required to access or process unused operand offsets bytes.

It should be noted that although the examples have depicted operands with having at most two operand offsets associated with a particular operand base, the described storing mechanisms also reduce the amount of unused space in instructions that have operands that contain more than two operand offsets. Thus, the previous examples have contained a particular number of operand offsets for use of explanation only and not as a limitation on the embodiments of the invention as each operand may have a variable number of associated operand offsets.

In the foregoing specification, the invention has been described with reference to specific embodiments thereof. It will, however, be evident that various modifications and changes may be made thereto without departing from the broader spirit and scope of the invention. For example, although the illustrated embodiments discuss interpreted computer instructions, the invention is equally applicable to native machine instructions. In this context, the advantages provided by the invention would include a reduction in the size of executables or other compiled units of code (such as libraries). The specification and drawings are, accordingly, to be regarded in an illustrative rather than a restrictive sense.

What is claimed is:

1. A method for generating computer instructions having a variable length operand offset, the method comprising the computer implemented steps of:

for each computer instruction that includes one or more variable length operand offsets, generating one or more operand bases for the computer instruction; and performing the following steps for each variable length operand offset of said one or more variable length operand offsets in said computer instruction, generating the variable length operand offset for the computer instruction, wherein the variable length operand offset is associated with an operand base;

generating an operand offset length for the computer instruction, wherein the operand offset length is a value that equals the number of bytes used to store the variable length operand offset; and generating the computer instruction to include said operand base, said operand offset length, and said variable length operand offset, wherein said computer instruction has an order and wherein said operand offset length precedes said variable length operand offset in said order;

wherein each computer instruction includes a first field and a second field;

wherein said second field is used to store variable length operand offsets; and wherein said first field is used to only store operand offset lengths that are values that equal the number of bytes used to store the variable length operand offset.

2. The method of claim 1, wherein:

the step of generating the variable length operand offset for the computer instruction includes the step of generating multiple variable length operand offsets for the computer instruction; and the step of generating the operand offset length for the computer instruction includes the step of generating multiple operand offset lengths for the computer instruction.

3. The method of claim 1, further comprising the step of generating a control code for the computer instruction, wherein the control code indicates whether the variable length operand offset is to be applied with a direct or indirect addressing mode.

4. The method of claim 2, further comprising the step of generating multiple control codes for the computer instruction, wherein each of the multiple control codes indicates whether a respective one of the variable length operand offsets is to be applied with a direct or indirect addressing mode.

5. The method of claim 1, further comprising the step of generating a control code for the computer instruction, wherein the control code indicates whether the variable length operand offset represents a last offset value for the computer instruction that is associated with the operand base.

6. The method of claim 1, wherein the step of generating the operand base for the computer instruction includes the step of generating a value identifying a register.

7. The method of claim 1, further comprising the step of generating the operand base and operand offset length in a single byte within the computer instruction.

8. The method of claim 3, further comprising the step of generating the operand base, the operand offset length and the control code in a single byte within the computer instruction.

9. The method of claim 3, further comprising the step of generating the operand offset length and the control code in a single byte within the computer instruction.

10. The method of claim 1, wherein the step of generating the operand base for the computer instruction includes the step of generating four bits, wherein the four bits represent the operand base for the computer instruction.

11. The method of claim 1, wherein the step of generating the variable length operand offset for the computer instruction includes the step of generating two bits, wherein the two bits represent the length of the variable length operand offset for the computer instruction.

12. The method of claim 3, wherein the step of generating the control code for the computer instruction includes the step of generating two bits, wherein the two bits represent the control code for the computer instruction.

13. The method of claim 1, wherein the step of generating the variable length operand offset for the computer instruction includes the step of generating a direct variable length operand offset, wherein the direct variable length operand offset represents an offset that is to be applied in a direct addressing mode.

14. The method of claim 1, wherein the step of generating the variable length operand offset for the computer instruction includes the step of generating an indirect variable length operand offset, wherein the indirect variable length operand offset represents an offset that is to be applied in an indirect addressing mode.

15. The method of claim 1, further comprising the steps of:

generating the operand offset length in a first location associated with the computer instruction; and generating the variable length operand offset in a second location associated with the computer instruction, wherein the first location is processed before the second location when the computer instruction is interpreted or executed.

16. The method of claim 15, further comprising the step of generating the operand base in the first location associated with the computer instruction.

17. The method of claim 3, further comprising the steps of:

generating the operand offset length in a first location associated with the computer instruction; and generating the variable length operand offset in a second location associated with the computer instruction, wherein the first location is processed before the second location when the computer instruction is interpreted or executed.

18. The method of claim 17, further comprising the step of generating the operand base in the first location associated with the computer instruction.

19. The method of claim 18, further comprising the step of generating the control code in the first location associated with the computer instruction.

20. The method of claim 1, wherein:
the step of generating the operand base for the computer instruction includes the step of generating the operand base for an interpreted computer instruction;
the step of generating the variable length operand offset for the computer instruction includes the step of generating the variable length operand offset for the interpreted computer instruction; and
the step of generating the operand offset length for the computer instruction includes the step of generating the operand offset length for the interpreted computer instruction.

21. The method of claim 3, further comprising the step of generating the operand offset length, the control code and an operand offset sign in a single byte within the computer instruction, wherein the operand offset sign indicates whether the variable length operand offset represents a positive or negative offset value.

22. The method of claim 1, wherein the step of generating said operand offset length includes the steps of:
determining a minimum number of bytes required to represent said variable length operand offset without any leading zeros; and
generating said operand offset length to equal said minimum number of bytes required to represent said variable length operand offset without any leading zeros.

23. A computer-readable medium carrying one or more sequences of instructions for generating computer instructions having a variable length operand offset, wherein execution of the one or more sequences of instructions by one or more processors causes the one or more processors to perform the steps of:
for each computer instruction that includes one or more variable length operand offsets, generating one or more operand bases for the computer instruction; and
performing the following steps for each variable length operand offset of said one or more variable length operand offsets in said computer instruction,
generating the variable length operand offset for the computer instruction, wherein the variable length operand offset is associated with an operand base;
generating an operand offset length for the computer instruction, wherein the operand offset length is a value that equals the number of bytes used to store the variable length operand offset; and
generating the computer instruction to include said operand base, said operand offset length, and said variable length operand offset, wherein said computer instruction has an order and wherein said operand offset length precedes said variable length operand offset in said order;
wherein each computer instruction includes a first field and a second field;
wherein said second field is used to store variable length operand offsets; and
wherein said first field is used to only store operand offset lengths that are values that equal the number of bytes used to store the variable length operand offset.

24. The computer-readable medium of claim 23, wherein:
the step of generating the variable length operand offset for the computer instruction includes the step of generating multiple variable length operand offsets for the computer instruction; and
the step of generating the operand offset length for the computer instruction includes the step of generating multiple operand offset lengths for the computer instruction.

25. The computer-readable medium of claim 23, wherein the computer-readable medium further comprises instructions for performing the step of generating a control code for the computer instruction, wherein the control code indicates whether the variable length operand offset is to be applied with a direct or indirect addressing mode.

26. The computer-readable medium of claim 24, wherein the computer-readable medium further comprises instructions for performing the step of generating multiple control codes for the computer instruction, wherein each of the multiple control codes indicates whether a respective one of the variable length operand offsets is to be applied with a direct or indirect addressing mode.

27. The computer-readable medium of claim 23, wherein the computer-readable medium further comprises instructions for performing the step of generating a control code for the computer instruction, wherein the control code indicates whether the variable length operand offset represents a last offset value for the computer instruction that is associated with the operand base.

28. The computer-readable medium of claim 23, wherein the step of generating the operand base for the computer instruction includes the step of generating a value identifying a register.

29. The computer-readable medium of claim 23, wherein the computer-readable medium further comprises instructions for performing the step of generating the operand base and operand offset length in a single byte within the computer instruction.

30. The computer-readable medium of claim 25, wherein the computer-readable medium further comprises instructions for performing the step of generating the operand base, the operand offset length and the control code in a single byte within the computer instruction.

31. The computer-readable medium of claim 25, wherein the computer-readable medium further comprises instructions for performing the step of generating the operand offset length and the control code in a single byte within the computer instruction.

32. The computer-readable medium of claim 23, wherein the step of generating the operand base for the computer instruction includes the step of generating four bits, wherein the four bits represent the operand base for the computer instruction.

33. The computer-readable medium of claim 23, wherein the step of generating the variable length operand offset for the computer instruction includes the step of generating two bits, wherein the two bits represent the length of the variable length operand offset for the computer instruction.

34. The computer-readable medium of claim 25, wherein the step of generating the control code for the computer instruction includes the step of generating two bits, wherein the two bits represent the control code for the computer instruction.

35. The computer-readable medium of claim 23, wherein the step of generating the variable length operand offset for the computer instruction includes the step of generating a direct variable length operand offset, wherein the direct variable length operand offset represents an offset that is to be applied in a direct addressing mode.

36. The computer-readable medium of claim 23, wherein the step of generating the variable length operand offset for the computer instruction includes the step of generating an indirect variable length operand offset, wherein the indirect variable length operand offset represents an offset that is to be applied in an indirect addressing mode.

37. The computer-readable medium of claim 23, wherein the computer-readable medium further comprises instructions for performing the steps of:
generating the operand offset length in a first location associated with the computer instruction; and
generating the variable length operand offset in a second location associated with the computer instruction, wherein the first location is processed before the second location when the computer instruction is interpreted or executed.

38. The computer-readable medium of claim 37, wherein the computer-readable medium further comprises instructions for performing the step of generating the operand base in the first location associated with the computer instruction.

39. The computer-readable medium of claim 25, wherein the computer-readable medium further comprises instructions for performing the steps of:
generating the operand offset length in a first location associated with the computer instruction; and
generating the variable length operand offset in a second location associated with the computer instruction, wherein the first location is processed before the second location when the computer instruction is interpreted or executed.

40. The computer-readable medium of claim 39, wherein the computer-readable medium further comprises instructions for performing the step of generating the operand base in the first location associated with the computer instruction.

41. The computer-readable medium of claim 40, wherein the computer-readable medium further comprises instructions for performing the step of generating the control code in the first location associated with the computer instruction.

42. The computer-readable medium of claim 23, wherein:
the step of generating the operand base for the computer instruction includes the step of generating the operand base for an interpreted computer instruction;
the step of generating the variable length operand offset for the computer instruction includes the step of generating the variable length operand offset for the interpreted computer instruction; and
the step of generating the operand offset length for the computer instruction includes the step of generating the operand offset length for the interpreted computer instruction.

43. The computer-readable medium of claim 25, wherein the computer-readable medium further comprises instructions for performing the step of generating the operand offset length, the control code and an operand offset sign in a single byte within the computer instruction, wherein the operand offset sign indicates whether the variable length operand offset represents a positive or negative offset value.

44. The computer-readable medium of claim 23, wherein the step of generating said operand offset length includes the steps of:
determining a minimum number of bytes required to represent said variable length operand offset without any leading zeros; and
generating said operand offset length to equal said minimum number of bytes required to represent said variable length operand offset without any leading zeros.

45. A computer system for generating computer instructions having a variable length operand offset, the computer system comprising:
a memory;
one or more processors coupled to the memory; and
a set of instructions contained in the memory, the set of instructions including instructions which when executed by the one or more processors, cause the one or more processors to perform the steps of:
for each computer instruction that includes one or more variable length operand offsets,
generating one or more operand bases for the computer instruction; and
performing the following steps for each variable length operand offset of said one or more variable length operand offsets in said computer instruction,
generating the variable length operand offset for the computer instruction, wherein the variable length operand offset is associated with an operand base;
generating an operand offset length for the computer instruction, wherein the operand offset length is a value that equals the number of bytes used to store the variable length operand offset; and
generating the computer instruction to include said operand base, said operand offset length, and said variable length operand offset, wherein said computer instruction has an order and wherein said operand offset length precedes said variable length operand offset in said order;
wherein each computer instruction includes a first field and a second field;
wherein said second field is used to store variable length operand offsets; and
wherein said first field is used to only store operand offset lengths that are values that equal the number of bytes used to store the variable length operand offset.

46. The computer system of claim 45, wherein:
the step of generating the variable length operand offset for the computer instruction includes the step of generating multiple variable length operand offsets for the computer instruction; and
the step of generating the operand offset length for the computer instruction includes the step of generating multiple operand offset lengths for the computer instruction.

47. The computer system of claim 45, wherein the set of instructions further comprises instructions for performing the step of generating a control code for the computer instruction, wherein the control code indicates whether the variable length operand offset is to be applied with a direct or indirect addressing mode.

48. The computer system of claim 46, wherein the set of instructions further comprises instructions for performing the step of generating multiple control codes for the computer instruction, wherein each of the multiple control codes indicates whether a respective one of the variable length operand offsets is to be applied with a direct or indirect addressing mode.

49. The computer system of claim 45, wherein the set of instructions further comprises instructions for performing the step of generating a control code for the computer instruction, wherein the control code indicates whether the variable length operand offset represents a last offset value for the computer instruction that is associated with the operand base.

50. The computer system of claim 45, wherein the step of generating the operand base for the computer instruction includes the step of generating a value identifying a register.

51. The computer system of claim 45, wherein the set of instructions further comprises instructions for performing the step of generating the operand base and operand offset length for a single byte within the computer instruction.

52. The computer system of claim 47, wherein the set of instructions further comprises instructions for performing the step of generating the operand base, the operand offset length and the control code for a single byte within the computer instruction.

53. The computer system of claim 47, wherein the set of instructions further comprises instructions for performing the step of generating the operand offset length and the control code in a single byte within the computer instruction.

54. The computer system of claim 45, wherein the step of generating the operand base for the computer instruction includes the step of generating four bits, wherein the four bits represent the operand base for the computer instruction.

55. The computer system of claim 45, wherein the step of generating the variable length operand offset for the computer instruction includes the step of generating two bits, wherein the two bits represent the length of the variable length operand offset for the computer instruction.

56. The computer system of claim 47, wherein the step of generating the control code for the computer instruction includes the step of generating two bits, wherein the two bits represent the control code for the computer instruction.

57. The computer system of claim 45, wherein the step of generating the variable length operand offset for the computer instruction includes the step of generating a direct variable length operand offset, wherein the direct variable length operand offset represents an offset that is to be applied in a direct addressing mode.

58. The computer system of claim 45, wherein the step of generating the variable length operand offset for the computer instruction includes the step of generating an indirect variable length operand offset, wherein the indirect variable length operand offset represents an offset that is to be applied in an indirect addressing mode.

59. The computer system of claim 45, wherein the set of instructions further comprises instructions for performing the steps of:
generating the operand offset length in a first location associated with the computer instruction; and
generating the variable length operand offset in a second location associated with the computer instruction, wherein the first location is processed before the second location when the computer instruction is interpreted or executed.

60. The computer system of claim 59, wherein the set of instructions further comprises instructions for performing the step of generating the operand base in the first location associated with the computer instruction.

61. The computer system of claim 47, wherein the set of instructions further comprises instructions for performing the steps of:
generating the operand offset length in a first location associated with the computer instruction; and
generating the variable length operand offset in a second location associated with the computer instruction, wherein the first location is processed before the second location when the computer instruction is interpreted or executed.

62. The computer system of claim 61, wherein the set of instructions further comprises instructions for performing the step of generating the operand base in the first location associated with the computer instruction.

63. The computer system of claim 62, wherein the set of instructions further comprises instructions for performing the step of generating the control code in the first location associated with the computer instruction.

64. The computer system of claim 45, wherein:
the step of generating the operand base for the computer instruction includes the step of generating the operand base for a interpreted computer instruction;
the step of generating the variable length operand offset for the computer instruction includes the step of generating the variable length operand offset for the interpreted computer instruction; and
the step of generating the operand offset length for the computer instruction includes the step of generating the operand offset length for the interpreted computer instruction.

65. The computer system of claim 47, wherein the set of instructions further comprises instructions for performing the step of generating the operand offset length, the control code and an operand offset sign in a single byte within the computer instruction, wherein the operand offset sign indicates whether the variable length operand offset represents a positive or negative offset value.

66. The computer system of claim 45, wherein the step of generating said operand offset length includes the steps of:
determining a minimum number of bytes required to represent said variable length operand offset without any leading zeros; and
generating said operand offset length to equal said minimum number of bytes required to represent said variable length operand offset without any leading zeros.

67. A computer-readable medium having stored thereon one or more sequences of instructions, wherein the one or more sequences of instructions include one or more instructions having:
an operand base;
one or more variable length operand offsets that are associated with the operand base; and
one or more operand offset lengths, wherein each operand offset length is associated with a variable length operand offset and has a value that equals the number of bytes used to store the variable length operand offset;
wherein said one or more instructions have an order and wherein each operand offset length precedes its associated variable length operand offset in said order;
wherein said one or more instructions include one or more first fields and one or more second fields;
wherein said one or more second fields are used to store variable length operand offsets;
wherein said one or more first fields are used to only store operand offset lengths that are values that equal the number of bytes used to store the associated variable length operand offset; and
wherein the operand offset length stored in said one or more first fields may be inspected during execution of said one or more instructions to determine how many bytes are used to store said variable length operand offsets.

68. A method for generating computer instructions having a variable length operand offset, the method comprising the computer implemented steps of:
for each computer instruction that includes one or more variable length operand offsets, generating one or more operand bases for the computer instruction; and
performing the following steps for each variable length operand offset of said one or more variable length operand offsets in said computer instruction,
generating the variable length operand offset for the computer instruction, wherein the variable length operand offset is associated with an operand base;

determining a minimum number of bytes required to represent said variable length operand offset without any leading zeros;

generating an operand offset length, wherein for all operand offset length values the operand offset length equals the minimum number of bytes required to represent said variable length operand offset without any leading zeros; and generating the computer instruction to include said operand base, said operand offset length, and said variable length operand offset;

wherein the computer instruction includes a first field and a second field;

wherein said second field is used to store variable length operand offsets; and wherein said first field is used to only store operand offset lengths that are values that equal the minimum number of bytes required to represent said variable length operand offset without any leading zeros.

* * * * *